June 9, 1959 W. SHOCKLEY 2,890,139
SEMI-CONDUCTIVE MATERIAL PURIFICATION METHOD AND APPARATUS
Filed Dec. 10, 1956
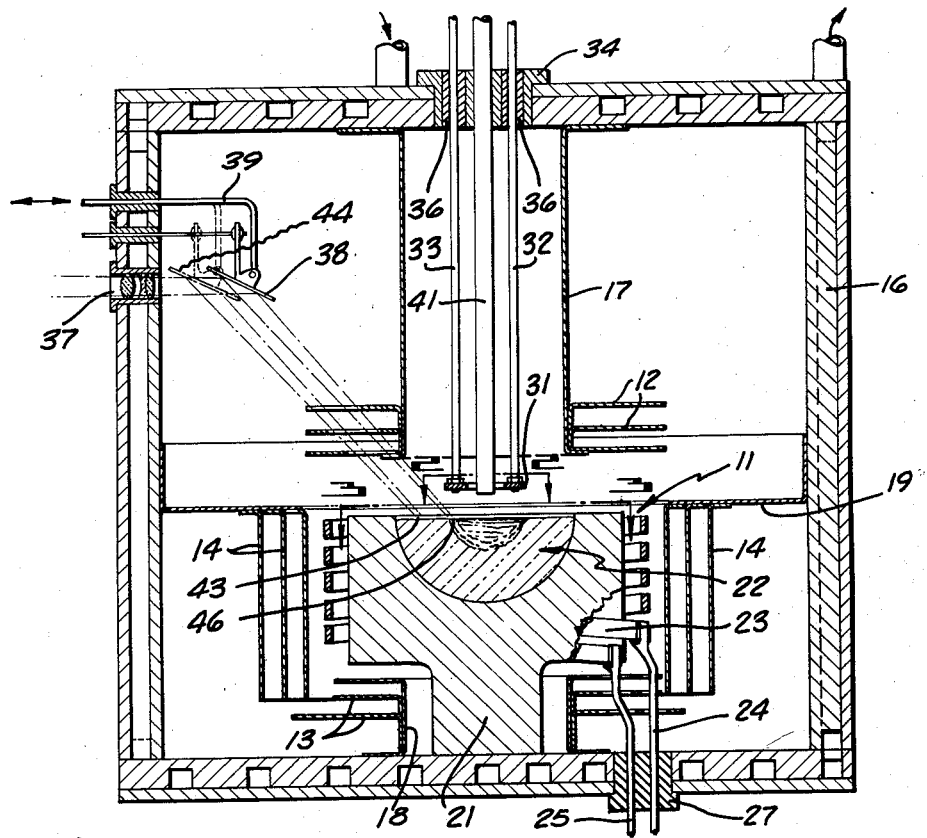
FIG_1
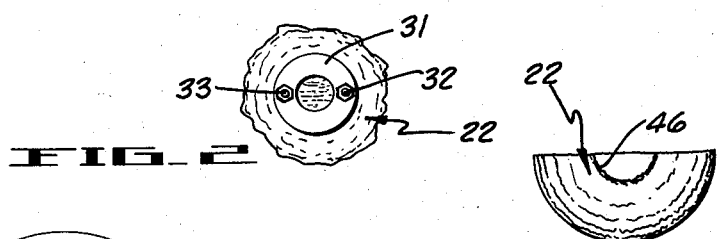
FIG_2
FIG_3
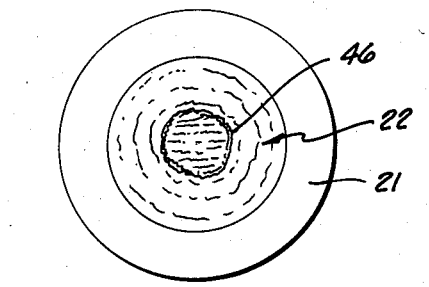
FIG_4
WILLIAM SHOCKLEY
INVENTOR.
BY
ATTORNEYS united States Patent Office 2,890,139
Patented June 9, 1959

2,890,139

SEMI-CONDUCTIVE MATERIAL PURIFICATION METHOD AND APPARATUS

William Shockley, Los Altos, Calif.

Application December 10, 1956, Serial No. 627,440

4 Claims. (Cl. 148—1)

This invention relates generally to a semi-conductive material purification method and apparatus.

In the semi-conductor art the most successful approach to the construction of devices has been to purify the material to the maximum extent possible, and then to add impurities to get the desired properties.

In the purification of germanium the zone melting process has been found to be the most successful. In this process an ingot of material is placed in a carbon crucible or boat and the assembly is placed in an inert gas atmosphere. For example, the assembly may be placed in a quartz tube through which inert gases continuously circulate. A short section of the ingot is melted and the molten zone is moved slowly longitudinally along the same. The restricted zone is heated by means of R-F coils wound around the quartz envelope. The boat and material are moved whereby the molten zone progresses longitudinally. In many instances as many as six R-F coils are used in tandem to give the same purification as would six passes with one coil.

Purification depends upon the fact that most impurities in germanium prefer the liquid phase rather than the solid. Thus, as the molten zone is moved along, the impurities find their way into the molten zone and are swept along the material. The impurities collect at the end of the material. The end is cut off and discarded.

In the zone purification of silicon the silicon is disposed in a quartz boat. Difficulties are encountered, however, in that the melting point of silicon is substantially higher than for germanium and impurities in the quartz boat find their way into the silicon material. Further, because of the high temperatures quartz boats are used for only one or two runs, cracking and necessitating replacement.

To overcome the difficulties encountered when employing a boat, a process has been developed in which an elongated bar of silicon is held vertically and the molten zone is moved down the same. The surface tension of the molten silicon must be sufficient to hold the molten region and prevent the same from breaking away. As a result, the size of bars which may be purified is limited. The best techniques available permit purification of crystals a few millimeters across. Thus, a relatively small amount of silicon can be purified by this process in any run. Consequently, the purification process takes a relatively long time and the silicon so purified becomes relatively expensive.

It is an object of the present invention to provide an improved semi-conductive material purification method and apparatus.

It is another object of the present invention to provide a semi-conductive purification method and apparatus capable of purifying substantial quantities of a material in one run.

It is still another object of the present invention to provide a purification method and apparatus in which a pool of material is progressively solidified to concentrate the impurities in a molten puddle.

These and other objects of the invention will become more clearly apparent from the following description read in conjunction with the accompanying drawing:

Figure 1 is a sectional view showing a suitable apparatus for carrying out the invention;

Figure 2 is a sectional view taken along the line 2—2 of Figure 1;

Figure 3 is a top view showing the crucible, the solidified material and the molten core; and Figure 4 is a sectional view of a piece of material formed in accordance with the invention.

Referring to Figure 1, a suitable apparatus is illustrated. The apparatus includes an oven region 11 which lies between the disc-shaped reflecting members 12 and 13, and the cylindrical members 14. These members are suitably supported from a water-cooled housing 16. For example, the discs 12 may be suitably attached to and supported by a cylinder 17. The members 13 are suitably attached to and supported by member 18. The members 14 are supported by brackets 19 which are suitably attached to the walls of the water-cooled housing. Disposed in the oven region 11 is a crucible 21 which may be made of graphite or other suitable material. The semi-conductive material 22 is placed in the crucible. The crucible is heated, by means of a heater coil, consisting, for example, of a double helix of graphite 23. Power is supplied to the coils from outside the housing. For example, leads 24 and 25 may extend through the water housing and insulated therefrom by the insulator 27.

A suitable surface heater 31 (Figure 2) is supported above the surface of the material 22 by means of the rods 32 and 33 which serve to supply electric power thereto. The wires extend upwardly through the plug 34 which is attached to the cover of the housing. Suitable insulating sleeves 36 serve to insulate the wires from the housing. A power supply (not shown) serves to supply power to the leads 32 and 33 whereby the surface of the pool is heated. The distance between the heater 31 and the surface of the material 22 may be controlled by drawing the rods 32 and 33 upwardly and downwardly within the insulating sleeves 36. A window 37 is formed in the side of the water-cooled housing and provides means for viewing the surface of the molten pool. A flat surface mirror 38 is mounted on the arm 39 which extends outwardly from the side of the housing. The mirror may be moved in and out whereby the surface of the material 22 may be viewed. By using an optical pyrometer which is sighted on the surface, the temperature of the material 22 may be determined.

The complete housing is preferably vacuum tight and vacuum means serves to maintain the interior of the same under a vacuum whereby the molten material is disposed in a vacuum. Thus, heat exchange by convection is considerably reduced and the danger of contaminating the material with impurities is considerably reduced. Alternatively, an inert gas, such as helium or argon, may be employed to reduce evaporation. A more complete description of a suitable oven is given in copending application entitled "Crystal Growing Method and Apparatus," filed August 2, 1956, Serial No. 601,815.

A hollow tube 41 extends downwardly from the cover and provides a means for removing the molten material from the molten zone. For example, the molten material may be removed by providing a jet of gas which flows downwardly and blows the molten material out of the pool into the surrounding housing where it may be removed after the completion of a run. On the other hand, the material may be removed by providing a vacuum to the tube, dipping the tube in the molten material and removing the molten material.

Alternatively, the entire furnace may be mounted on an axis and tipped so as to pour the molten material out.

Purification of the material is carried out as follows: The material is placed in the crucible 21 and the R-F coil is energized to heat the crucible and material. When the material is molten, the power applied to the R-F coil is decreased whereby the crucible is maintained at a temperature which is slightly below the melting point of the material. Power is applied to the surface heater and the power is gradually decreased whereby the size of the puddle gradually decreases. As the material solidifies, the impurities which have a preference for the liquid phase, are swept into the molten puddle. As the volume of the solid phase increases, the concentration of impurities in the decreasing liquid phase increases. When the molten puddle reaches a predetermined small volume, it is removed and new material added to replenish the material which is removed. The power to the surface heater 31 is then increased to thereby increase the size of the molten puddle. When the melt reaches a predetermined large volume, the power supplied to the heater is reduced and the solid phase again increases to reduce the size of the puddle. The process is repeated until the material reaches the desired purity.

The power supplied to the heater 31 may be controlled by viewing the surface in the region 43. When the solid-liquid interface reaches the point 43, the heat to the heater 31 is reduced whereby further increase of the molten region is stopped. The control apparatus is the type as described in the aforementioned copending application. The predetermined small size of the melt may be observed by moving the mirror 38 inwardly to the dotted line 44 and observing the surface of the point 46, the molten material is blown out or removed when the solid-liquid interface reaches this point. The mirror 38 is moved back to the original position and the power to 31 increased until the solid-liquid interface again reaches the point 43. In order to calibrate a particular piece of apparatus, it may be desirable to purify material as described and then to cut and measure the same and observe how far the melt extended during each pass. A map of lines of equal conductivity of the type shown in Figure 4 results.

It is seen that larger volumes of material may be purified than in the vertical bar zone refining method. This greatly reduces the time required for purifying a given amount of material. The cost per pound of purified material is greatly reduced.

I claim:

1. The method of purifying semi-conductive material which includes the steps of forming a molten puddle of material completely contained in the material, progressively solidifying the material whereby the volume of the molten puddle progressively decreases, and removing the molten material when the volume reaches a predetermined small value.

2. The method of purifying semi-conductive material which comprises the steps of maintaining the material at a temperature slightly below its melting point, applying heat to a predetermined small area of the surface whereby the material melts to form a puddle, progressively increasing the size of the puddle until a predetermined size is reached, progressively solidifying the material whereby the size of the puddle is progressively reduced, and removing molten material when the size of the puddle reaches a predetermined small volume.

3. A method as in claim 2 together with the steps of replenishing the removed material and repeating the steps of the process.

4. The method of purifying semiconductive material which comprises the steps of maintaining the material at a temperature slightly below its melting point, applying heat to a predetermined small area of the surface whereby the material melts to form a puddle, and progressively solidifying the material whereby the size of the puddle is progressively reduced.

References Cited in the file of this patent

UNITED STATES PATENTS

| | | |
|---|---|---|
| 921,183 | Tone | May 11, 1909 |
| 2,541,764 | Herres et al. | Feb. 13, 1951 |
| 2,615,060 | Marinace et al. | Oct. 21, 1952 |
| 2,640,860 | Herres et al. | June 2, 1953 |
| 2,703,296 | Teal | Mar. 1, 1955 |
| 2,750,310 | Franke | June 12, 1956 |
| 2,822,309 | Hall | Feb. 4, 1958 |